Feb. 3, 1953     H. F. KLEIN     2,627,440
WHEEL ASSEMBLY
Filed June 6, 1947
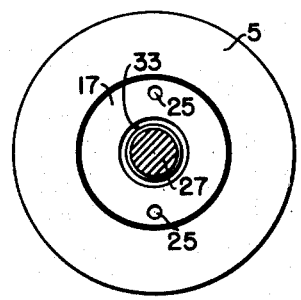
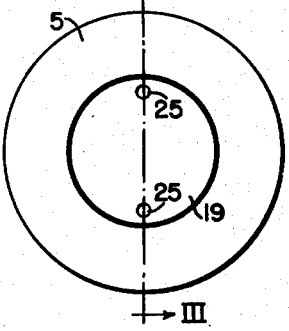
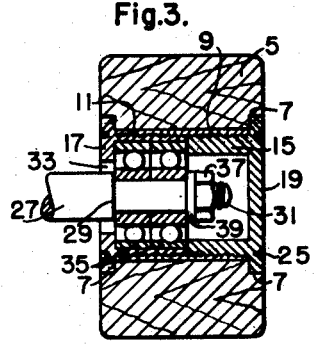
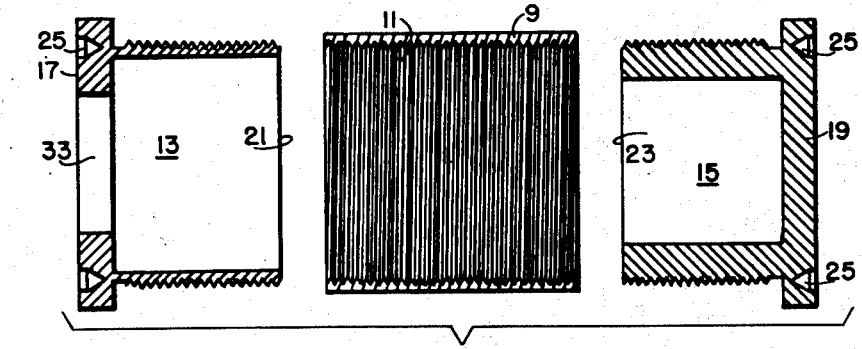
INVENTOR.
Howard F. Klein.
BY Hymen Diamond.
ATTORNEY Patented Feb. 3, 1953

2,627,440

UNITED STATES PATENT OFFICE 2,627,440

WHEEL ASSEMBLY

Howard F. Klein, Pittsburgh, Pa., assignor of twenty-five per cent to Hymen Diamond, Pittsburgh, Pa.

Application June 6, 1947, Serial No. 752,965

16 Claims. (Cl. 301—5.7)

My invention relates to wheel assemblies and has particular relation to skate-wheel assemblies.

The Mazveskas et al. Patent No. 2,252,132 is illustrative of skate-wheel assemblies constructed in accordance with the teachings of the prior art of which I am aware. The Mazveskas structure comprises a tire of wood, fibre or other material which is pressed onto a flanged shell. The shell holds the bearings of the skate axle. To prevent dust from penetrating into the bearing, the shell is closed at the end opposite the bearings. The end cap may be held in the shell by a semi-circular spring and thus also serves to hold the wheel secure on the shell. The end cap is provided with a flange which engages the tire.

When a skate including the Mazveskas bearing is in use, there is a tendency for the tire to move relative to the shell and to unscrew the end cap in spite of the locking mechanism provided for it. The end cap ordinarily falls off and is lost. The bearings then become clogged with dirt and the wheel has a tendency to fall off while the skate is in use. When the end cap falls off, it is, therefore necessary that the whole assembly be replaced.

At times the user of the skate, on noting that the end cap has fallen off, endeavors to secure it by screwing it to the tire. Since the tire is usually composed of wood, it is often cracked when the screw penetrates.

It is, accordingly, an object of my invention to provide a skate-wheel assembly in which the tire and the bearing assembly shall be securely locked.

Another object of my invention is to provide a self-locking bearing assembly for a skate-wheel.

A more general object of my invention is to provide a wheel assembly which need not be replaced as a whole when one or more of its separate parts fails.

Another general object of my invention is to provide a wheel assembly composed of a plurality of parts, each of which is readily removable from the assembly for replacement purposes.

A further general object of my invention is to provide a wheel-assembly having a tire composed of hard-wood fibre, composition or other like material which may be readily separated from the assembly but which, when it is combined in the assembly is securely held therein.

An ancillary object of my invention is to provide a tire for a skate-wheel.

More concisely stated, it is an object of my invention to provide a skate-wheel having a removable tire which, while in operation, shall be firmly secured against removal.

In accordance with my invention, I provide a bearing assembly composed of a shell and a pair of caps so related to the shell that the three units, when assembled, constitute a self-locking mechanism. The shell which serves as a bushing for the wheel-assembly is internally threaded. It is important that the internal thread of the shell should be the same throughout its length; preferably a right-hand thread. Each of the caps is made up of a stem having an external thread to engage the thread in the shell and a head of circular section. The caps are screwed into opposite ends of the shell. They are so dimensioned that their internally extending edges engage when the caps are completely screwed in. The caps are thus locked against each other. Rotation of the shell in either direction tends to tighten one cap or the other and thus to maintain the bearing assembly locked.

The novel features that I consider characteristic of my invention are set forth with particularity in the appended claims. The invention, itself, however, both as to its organization and its method of operation, together with additional objects and advantages thereof, will best be understood from the following description of a specific embodiment when read in connection with the accompanying drawing, in which Figure 1 is a view in side elevation showing a skate-wheel assembly from the face of the assembly through which the skate axle penetrates;

Fig. 2 is a view in side elevation of the face of the skate-wheel assembly opposite to that shown in Fig. 1;

Fig. 3 is a view in section taken along line III—III of Fig. 2; and

Fig. 4 is an exploded view in section showing the shells and caps of the self-locking bearing assembly.

The skate-wheel shown in the drawing comprises a tire 5 of hard wood, fibre, glass or other material. The tire is of the usual ring structure but differs from tires of the prior art skate-assemblies in that each of its base faces is provided with a rectangular counterbore 7 (that is, counterbore formed by cutting out a short cylinder coaxial with the tire from the center of each base face) at the center.

A cylindrical shell 9 having an internal thread 11 throughout serves as a bushing for the tire 5. The internal diameter of the tire and the external diameter of the shell 9 are so dimensioned that the tire slips readily onto the shell. In contrast to the prior art assemblies in which the tire is ordinarily pressed onto its bushing, the tire in my skate-assembly is simply slipped on and may as readily be removed. The tire 5 is held on the bushing shell 9 by a pair of threaded caps 13 and 15 which screw into the shell 9 and the heads 17 and 19, respectively, of which engage the counterbore 7. The sum of the lengths of the stems of the caps 13 and 15, respectively, from the inner surface of each head 17 and 19, respectively, is equal to the end-to-end length of the shell 9. Therefore, when the caps 13 and 15 are screwed into the shell 9 and their heads engage the counterbore 7, the internal edges 21 and 23 of the stems are in engagement and the assembly is tightly locked. It is essential in the practice of the specific aspects of my invention that the tire 5, the stems of the caps 13 and 15 and the shell 9 be accurately dimensioned to effect the locking operation properly. It is desirable that the stems and the shell be machined to at least .0005 inch.

The heads 17 and 19 of the caps are provided with diametrically arranged openings 25 in their faces. A wrench is inserted in the openings to screw the caps on the shell or to unscrew them from the shell. The openings 25 on the faces of either or both of the caps 13 and 15 may also serve for securing the prongs of a chunk so that the assembly may be mounted in a lathe or grinding machine for grinding the tire 5 so that it has the desired circular cross section.

From the axle housing 27 of the skate truck (not shown), the axle 31 projects. The axle is threaded at the end. The cap 17 on the inner face of the assembly is provided with an opening 33 through which the housing 27 is inserted. The diameter of the opening 33 is such that the housing 27 slips snugly but not tightly into the cap. Within the perforated cap 13 a pair of high precision ball bearings 35 are disposed. The inner diameter of the cap 13 is so dimensioned that the bearings 35 slide readily but not loosely into the cap. The housing 27 is slipped into the opening 33 to a position such that its end 29 is flush with the inner face of the cap 13. The axle 31 slips into the inner races 36 of the bearings 35. The bearings 35 are held firmly against the inner face of the cap 13 by a nut 37 which is screwed onto the axle 31 and is held by a lock washer 39.

In a preferred skate-wheel in accordance with my invention the tire 5 is composed of hard wood, and the shell 9, caps 13 and 15 and bearings 35 are composed of steel. Such a wheel operates precisely and smoothly and has good wearing qualities.

In operation, the whole wheel-assembly, which is locked by the cooperation of the caps 13 and 15 and the shell 9, rotates as a unit about the axle. Frictional losses are reduced by the ball bearings 35. Any rotation of the tire 5 about the shell 9 which occurs tends to rotate one or the other of the caps 13 or 15 in such a sense as to lock the tire 5 more tightly in the assembly.

In its specific aspects, my invention is particularly applicable to skate wheels and has peculiar advantages for such wheels. In its broader aspects, it is applicable to wheels generally such as casters for example.

In certain of its aspects, my invention also involves the provision of a less expensive skate wheel than the precise structure shown in the drawing. In the less expensive arrangement, the caps 13 and 15 may be tightened against a washer of circular section composed of steel, rubber, fiber or other material interposed between their edges 21 and 23, respectively.

While I have shown and described a certain specific embodiment of my invention, many modifications thereof are possible. My invention, therefore, is not to be restricted except insofar as is necessitated by the prior art and by the spirit of the appended claims.

I claim as my invention:

1. A wheel assembly comprising a bushing shell threaded internally throughout, a tire ring having an internal diameter such that it may be slipped onto said bushing shell, a first flanged cap to be screwed into said shell through one end thereof and a second flanged cap to be screwed into said shell through the other end thereof, said caps securing said tire on said shell.

2. A wheel assembly comprising a bushing shell threaded internally throughout, a tire ring having an internal diameter such that it may be slipped onto said bushing shell, said ring being counterbored at the center of its base faces, a first flanged cap to be screwed into said shell through one end thereof and a second flanged cap to be screwed into said shell through the other end thereof, the flanges of said caps engaging said counterbores to secure said tire on said shell.

3. A wheel assembly comprising a bushing shell threaded internally throughout, a tire ring slipped onto said bushing shell, a first cap to be screwed into said shell through one end thereof and a second cap to be screwed into said shell through the other end thereof, said caps being so dimensioned that when they are screwed into said shell their inner edges engage, and each said cap having a head which engages said tire when said inner edges are engaged to secure said tire on said shell.

4. A skate wheel assembly comprising a bushing shell threaded internally throughout, a tire ring having an internal diameter such that it may be slipped onto said bushing shell, a first flanged cap to be screwed into said shell through one end thereof and a second flanged cap to be screwed onto said shell through the other end thereof, said caps securing said tire on said shell and said second cap having a central opening therein through which a skate shaft may be inserted.

5. A skate wheel assembly comprising a bushing shell threaded internally throughout, a tire ring slipped onto said bushing shell, a first flanged cap to be screwed into said shell through one end thereof, a second flanged cap to be screwed into said shell through the other end thereof, said caps securing said tire on said shell and a bearing for a skate axle supported within said caps.

6. A skate wheel assembly comprising a bushing shell threaded internally throughout, a tire ring having an internal diameter such that it may be slipped onto said bushing shell, said ring being counterbored at the center on both base surfaces, a first flanged cap to be screwed into said shell through one end thereof, a second flanged cap to be screwed into said shell through the other end thereof, the flanges of said caps engaging said counterbore to secure said ring, and a bearing for a skate axle supported within said caps.

7. A wheel assembly comprising a bushing shell threaded internally throughout, a tire ring of hard wood having an internal diameter such that it may be slipped onto said bushing shell, a first flanged cap of steel to be screwed into said shell through one end thereof and a second flanged cap of steel to be screwed into said shell through the other end thereof, said steel caps securing said tire on said shell.

8. A skate wheel assembly comprising a bushing shell threaded internally throughout, a tire ring of hard wood having an internal diameter such that it may be slipped onto said bushing shell, said ring being counterbored at the center on both base surfaces, a first flanged cap of steel to be screwed into said shell through one end thereof, a second flanged cap of steel to be screwed into said shell through the other end thereof, the flanges of said caps engaging said counterbore to secure said ring, and a bearing for a skate axle supported within said caps.

9. A skate wheel assembly comprising a bushing shell threaded internally throughout, a tire ring having an internal diameter such that it may be slipped onto said bushing shell, said ring being counterbored at the center on both base surfaces, a first flanged cap to be screwed into said shell through one end thereof, a second flanged cap to be screwed into said shell through the other end thereof, the flanges of said caps engaging said counterbore to secure said ring, and ball bearing means for a skate axle supported within said caps.

10. A skate wheel assembly comprising a bushing shell threaded internally throughout, a tire ring having an internal diameter such that it may be slipped onto said bushing shell, said ring being counterbored at the center on both base surfaces, a first flanged cap to be screwed into said shell through one end thereof, a second flanged cap to be screwed into said shell through the other end thereof, the flanges of said caps engaging said counterbore to secure said ring, and high precision ball bearing means for a skate axle supported within said caps.

11. A skate wheel assembly comprising a bushing shell threaded internally throughout, a tire ring having an internal diameter such that it may be slipped onto said bushing shell, said ring being counterbored at the center on both base surfaces, a first flanged cap to be screwed into said shell through one end thereof, a second flanged cap to be screwed into said shell through the other end thereof, the flanges of said caps engaging said counterbore to secure said ring, and a bearing for a skate axle supported within said caps, said second cap having an opening therein of such dimension as just to clear the skate truck housing of said skate and said first cap being closed.

12. A skate wheel assembly comprising a bushing shell threaded internally throughout, a tire ring having an internal diameter such that it may be slipped onto said bushing shell, said ring being counterbored at the center on both base surfaces, a first flanged cap to be screwed into said shell through one end thereof, a second flanged cap to be screwed into said shell through the other end thereof, the flanges of said caps engaging said counterbore to secure said ring, the length of said caps being such that when they are screwed in, their edges engage so that they lock said ring on said shell.

13. A locking mechanism for locking a solid having a bore, said mechanism comprising a bushing shell threaded internally throughout the thread having the same direction of rotation throughout and said shell being adapted to be slid into said bore, a first flanged cap to be screwed into said shell through one end thereof when said shell is in said bore and a second flanged cap to be screwed into said shell through the opposite end thereof when said shell is in said bore, said caps being of such lengths that when they are screwed into said shell their inner edges are in engagement and their flanges grip said solid between them.

14. A mechanism for locking a solid which solid has a bore, said mechanism comprising a bushing shell threaded internally throughout, the thread having the same direction of rotation throughout and having an outer diameter such that it is adapted to be slipped into said bore, a first flanged cap to be screwed into said shell through one end thereof and a second flanged cap to be screwed into said shell through the other end thereof, said caps being dimensioned so that when they are screwed into said shell their internal edges engage and they grip said solid between them.

15. As an article of manufacture, a skate-wheel sub-assembly consisting of a skate tire having a bushing therein, the surface of said bushing towards the axis of said tire being threaded throughout with a thread having the same direction of rotation throughout and the outside radius of said bushing being smaller throughout the whole length of said bushing than the radius of the surface of the tire engaging said bushing.

16. In combination a solid having a bore, a shell within said bore threaded internally throughout, the thread of said shell having the same direction of rotation throughout, a first flanged cap screwed into said shell through one end thereof and a second flanged cap screwed into said shell through the opposite end thereof, said caps being of such length that when they are screwed into said shell their internal edges engage and their flanges grip said solid between them.

HOWARD F. KLEIN.

REFERENCES CITED

The following references are of record in the file of this patent:

UNITED STATES PATENTS

| Number | Name | Date |
|---|---|---|
| 343,185 | Mendenhall | June 8, 1886 |
| 533,341 | Boyle | Jan. 29, 1895 |
| 556,121 | Wolff | Mar. 10, 1896 |
| 1,100,242 | Howells | June 16, 1914 |
| 1,603,529 | Faust | Oct. 19, 1926 |
| 1,881,233 | Leighton | Oct. 4, 1932 |
| 1,908,799 | Tryon | May 16, 1933 |
| 1,978,814 | Myers | Oct. 30, 1934 |
| 2,240,894 | Roberts | May 6, 1941 |
| 2,304,944 | Martinec | Dec. 15, 1944 |
| 2,392,633 | Bierman | Jan. 8, 1946 |
| 2,432,105 | Wagner | Dec. 9, 1947 |

FOREIGN PATENTS

| Number | Country | Date |
|---|---|---|
| 742,829 | France | Mar. 17, 1933 |